No. 11,793.

Reissued Dec. 12, 1899.

M. C. HAWLEY.

FURNACE.

(Application filed Nov. 1, 1899.)

5 Sheets—Sheet 1.

Witnesses:
Chas. E. Gaylord,
Lute S. Otey

Inventor:
Melville C. Hawley,
By Banning & Banning & Sherman
Attys.

No. 11,793. Reissued Dec. 12, 1899.

M. C. HAWLEY.

FURNACE.

(Application filed Nov. 1, 1899.)

5 Sheets—Sheet 2.

Witnesses:
Chas. E. Gaylord,
Lulu D. Alter.

Inventor:
Melville C. Hawley,
By Banning & Banning & Sheridan,
Attys.

No. 11,793. Reissued Dec. 12, 1899.

M. C. HAWLEY.

FURNACE.

(Application filed Nov. 1, 1899.)

5 Sheets—Sheet 3.

Witnesses:
Chas. E. Gaylord.
Luke D. Pitts.

Inventor:
Melville C. Hawley,
By Banning & Banning & Sheridan,
Att'ys.

No. 11,793. Reissued Dec. 12, 1899.

M. C. HAWLEY.

FURNACE.

(Application filed Nov. 1, 1899.)

5 Sheets—Sheet 4.

Witnesses:
Chas. E. Gaylord,
Lute A. Pitney

Inventor:
Melville C. Hawley,
By Bunning & Bunning & Sheridan,
Attys.

No. 11,793. Reissued Dec. 12, 1899.

M. C. HAWLEY.

FURNACE.

(Application filed Nov. 1, 1899.)

5 Sheets—Sheet 5.

Upper Grate Bars.

Lower Grate Bars.

Witnesses:
Chas. E. Layford.
Lute S. Fitz

Inventor:
Melville C. Hawley,
By Banning & Banning & Sheridan,
Attys.

UNITED STATES PATENT OFFICE.

MELVILLE C. HAWLEY, OF ST. LOUIS, MISSOURI, ASSIGNOR TO THE HAWLEY DOWN DRAFT FURNACE COMPANY, A CORPORATION OF ILLINOIS, OF CHICAGO, ILLINOIS.

FURNACE.

SPECIFICATION forming part of Reissued Letters Patent No. 11,793, dated December 12, 1899.

Original No. 447,179, dated February 24, 1891. Application for reissue filed November 1, 1899. Serial No. 736,490.

*To all whom it may concern:*

Be it known that I, MELVILLE C. HAWLEY, of St. Louis, Missouri, have made a new and useful Improvement in Furnaces, of which the following is a full, clear, and exact description.

This improvement relates to downward-draft furnaces, and more especially, but not exclusively, for boiler-furnaces.

Its object is to insure a sufficient downward draft through the upper grate and at the same time a thorough and economical consumption of the fuel.

The leading feature of the improvement is the combination of a lower upward-burning grate with an upper downward-burning grate, the bars of said upper grate being spaced an unusual distance apart or so constructed as to provide unusually wide spaces between the bars, whereby ample provision for a downward draft through the upper fire is provided, as well as for the consumption of such partially-consumed fuel as may drop from the upper grate, all substantially as is hereinafter set forth and claimed, aided by the annexed drawings, making part of this specification, and exhibiting a desirable means for carrying out the improvement, and in which—

Figure 1:
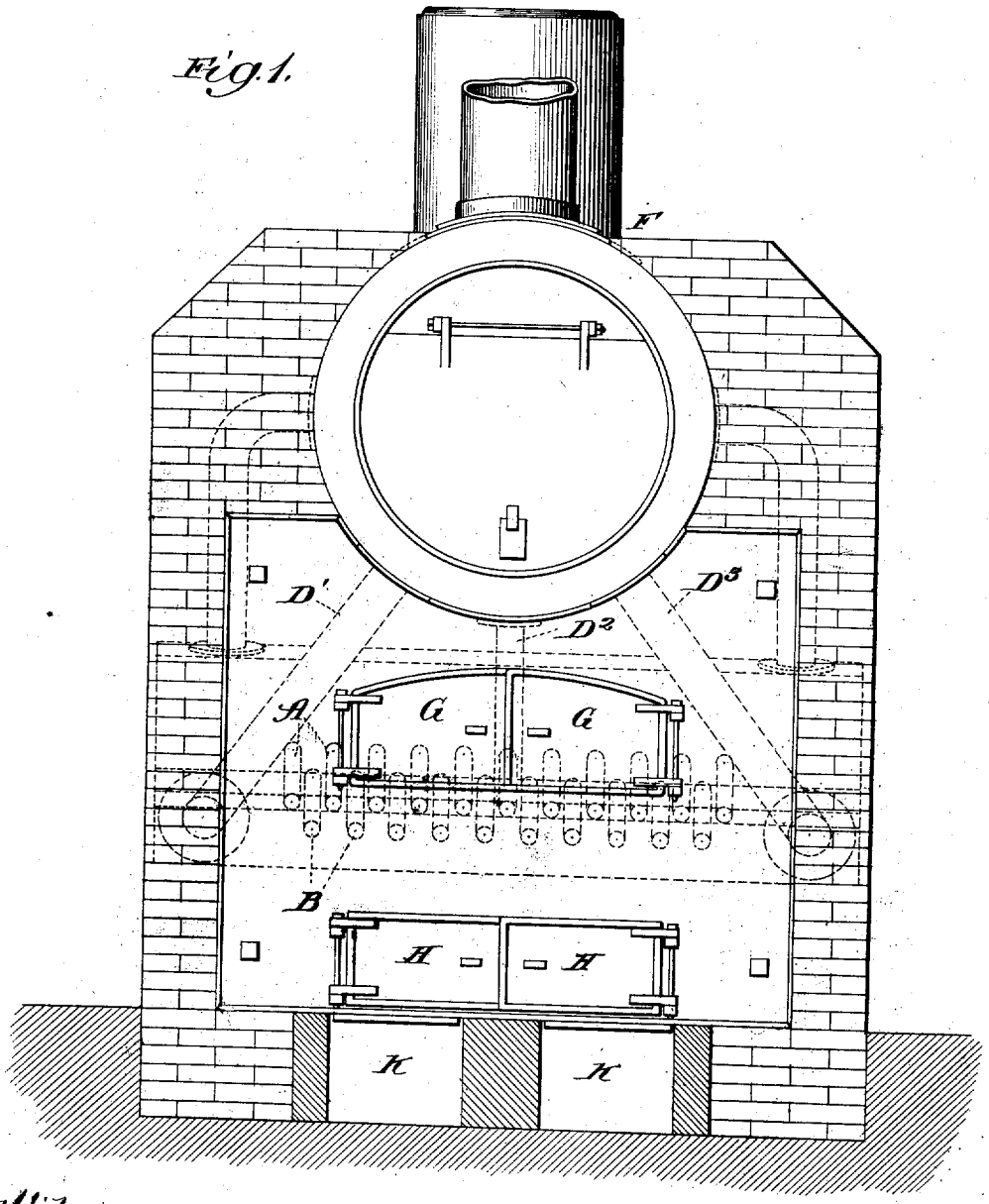
Figure 2:
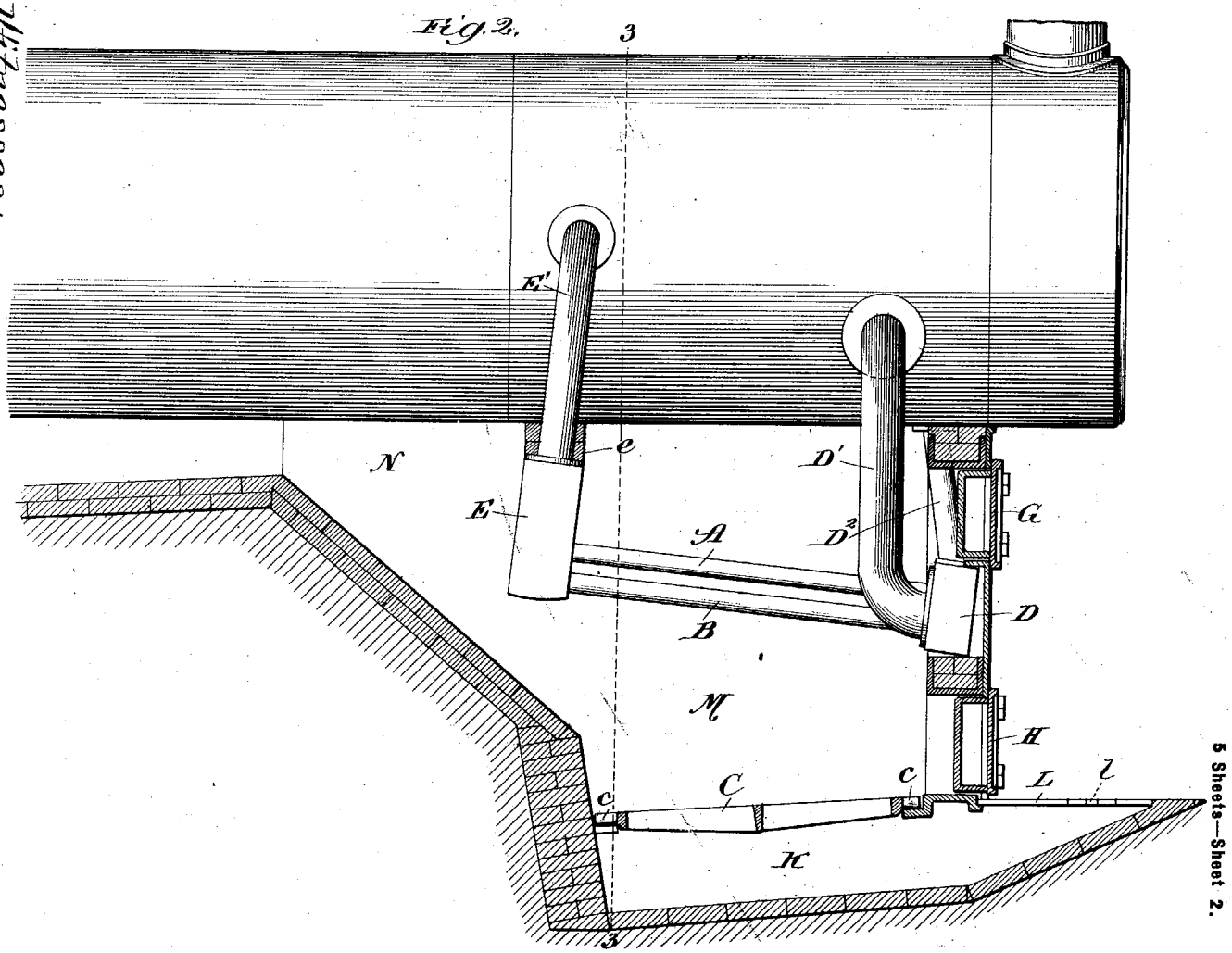
Figure 3:
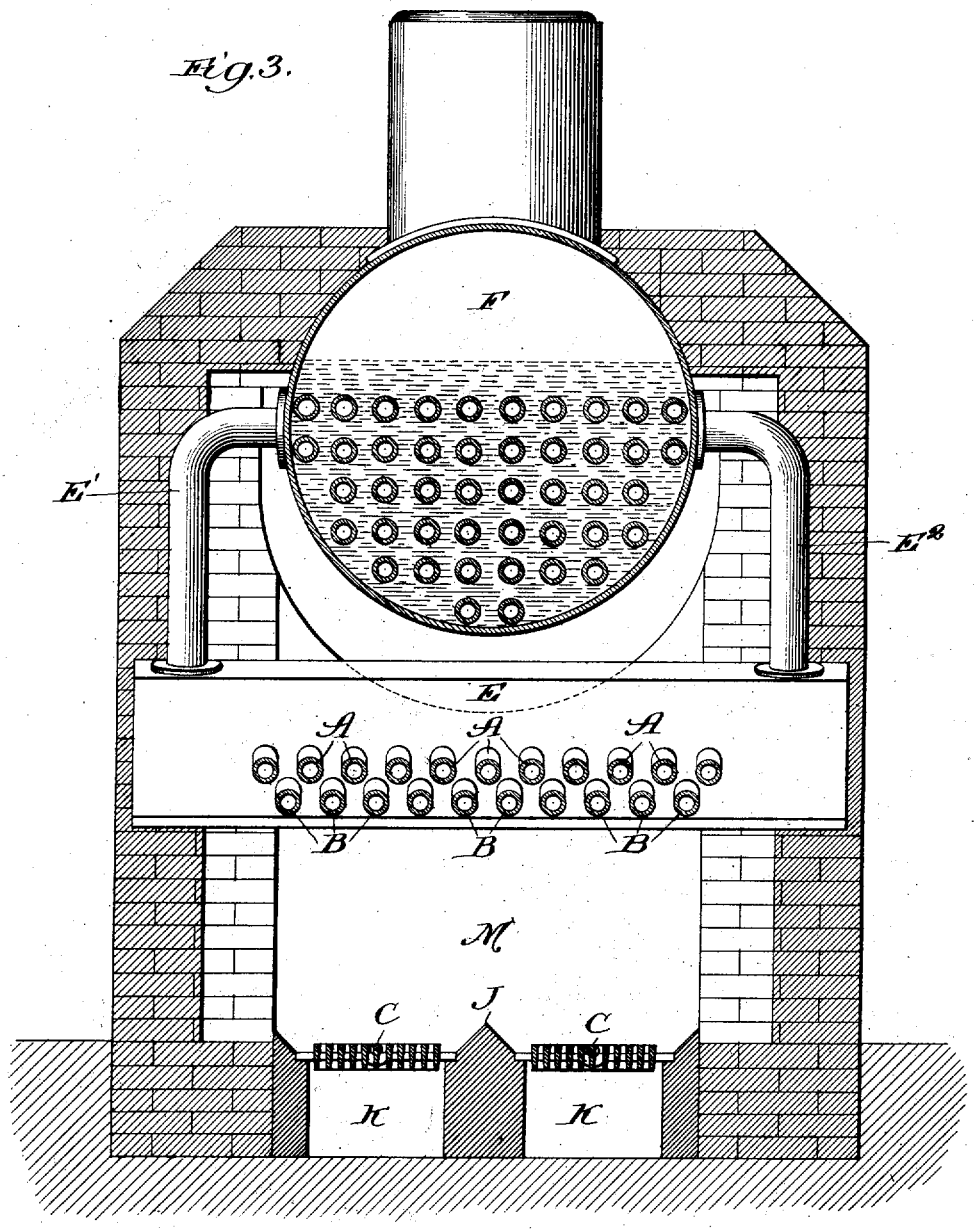
Figure 4:
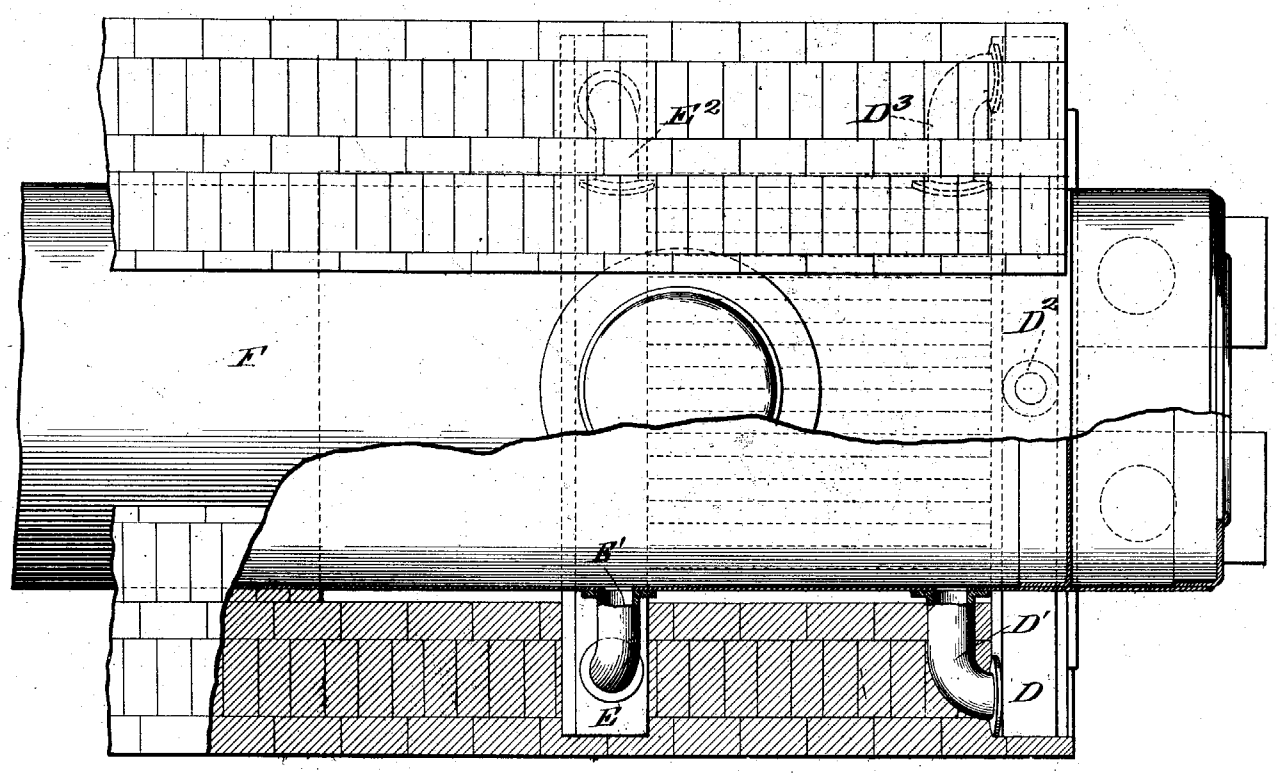
Figure 5:
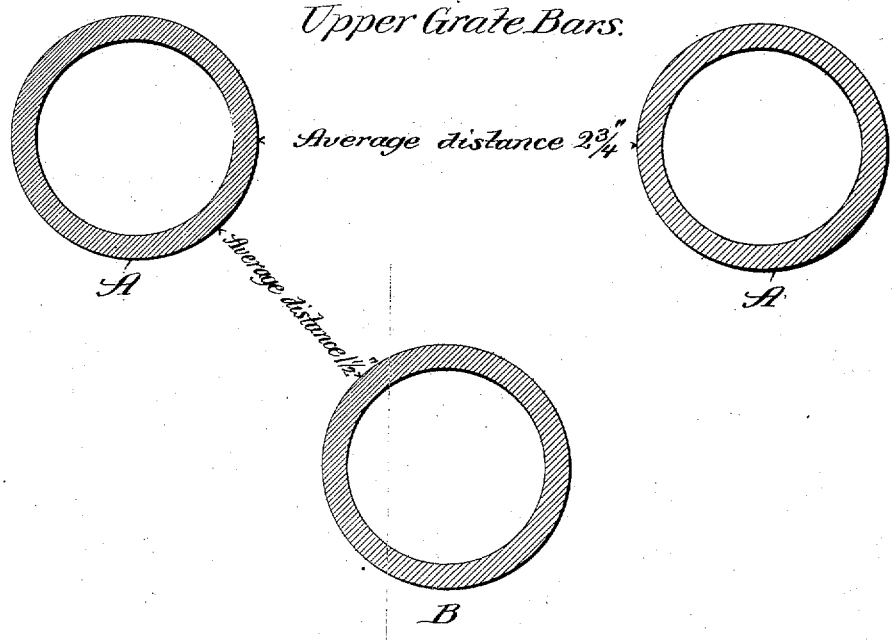
Figure 6:
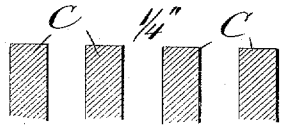

Figure 1 is a front elevation of an ordinary stationary multitubular boiler arranged according to this invention. Fig. 2 is a longitudinal view of the same within the boiler, and the parts constituting my invention are shown in side elevation, while the lower fire-grate, ash-pit, and flue are shown in section. Fig. 3 is a transverse section on the line 3 3 of Fig. 2; and Fig. 4 is a plan, partly in horizontal section, corresponding to Figs. 1, 2, and 3. Fig. 5 is a detail in section showing actual size, as well as distance apart, of the several bars of the upper grate. Fig. 6 is a detail in plan to show the distance apart in an actual grate of the lower grate-bars.

The same letters of reference denote the same parts.

In Figs. 1, 2, 3, and 4 the upper fire-grates consist of an upper and a lower row of inclined tubes, (marked A and B, respectively.) These tubes are sufficiently thick to resist the wear and destruction thereof which occurs through the action of firing, and the lower tubes B are respectively opposite the spaces between the upper tube A. Thus the two rows of tubes A and B constitute an upper fire-grate having a series of zigzag spaces, which, while being sufficiently contracted for effectively supporting the fuel during the first stages of its combustion, are yet sufficiently wide to provide for a downward draft and to allow the fuel after the earlier part of its combustion is effected to fall down through the bars of the upper grate and be caught upon the second fire-grate C below. This last-named grate C is constructed of ordinary bars arranged in the ordinary manner, and it is preferably a dumping-grate.

The tubes A in practice are arranged about two and three-quarter inches apart horizontally, and the distance between the bars A and B is about one and one-half inches.

The tubes A and B are supported in position by having their front ends fixed into the water-bridge D and their inner ends similarly fixed into the water-bridge E. The front or outer water-bridge D is united to the boiler F by means of the pipes $D'$ $D^2$ $D^3$, through which water may be conducted downward from a lower level in the boiler into the lower ends of the inclined water-tubes, and the back or inner water-bridge E is connected therewith by the pipes $E'$ $E^2$, through which water may be conducted upward from the higher ends of the water-tubes and delivered back to the boiler at a higher level therein. By means of these connections a complete circulation of water from the boiler through the water-bridges D E and through the tubes A and B is at all times maintained.

Fire-doors G are provided for enabling the fuel to be fed onto the upper grate, and a second set of fire-doors H are also provided for giving access to the fuel on the lower grate C. The lower grate-bars C may be arranged in two sets, as shown in the drawings, with a division of brickwork between them formed with an inclined top, as shown at J, Fig. 3, while at the outer sides of these fire-bars similar brickwork with an inclined top is used. These inclined surfaces cause the fuel which falls from the upper grate to locate itself upon the lower grate. The ash-pit K at the front end thereof is shown as closed over with a plate or plates L, in which a register *l* of the ordinary kind for regulating the passage of air may be fitted, or the ash-pits at that point may be left open or connected with a forced draft.

As the gases, smoke, flame, and the volatile products of combustion given off by the fuel on the upper fire-grate connot, by reason of the space between the water-bridge E and the boiler F being stopped by the fire-brick *e* or any equivalent wall, escape upward, they pass by the action of the draft downward through the spaces between the tubes A and B and into the combustion-chamber M between the grates, where they meet and become mixed with the like products escaping upward from the lower grate C, and the products of combustion from both the upper and lower grates are further consumed in the chamber M and thence escape together under the back water-bridge E into the flue N and thence through the remaining flues of the boiler.

In carrying out this invention I desire not to be limited to any particular construction at the inner end of the upper grate, whereby the downward draft from the upper fire-grate into the chamber M is completed. Any suitable form of wall, partition, water-leg, or combined water-bridge and wall may be used. Nor do I desire to be restricted to any special form of grate-bar or mode of directing a water circulation through the grate-bars and boiler, except that the upper grate shall be formed of inclined water-tubes, one or more rows, as desired, and shall have such connections as will permit water to be conducted down from near the bottom of the boiler into their lower ends and after passing through the tubes conducted upward from their higher ends and delivered back to the boiler at a point higher than the point from which it was originally taken. I prefer, however, the various forms exhibited in the drawings, and so far as forming an upper grate so that a downward draft may be successfully obtained and the fuel enabled to drop and the upper grate thereby kept from choking is concerned the zigzag system of bars A B shown is much the best, as by means thereof such lumps of the fuel as find their way downward onto the lower bars B have ample room to pass thence sidewise and downward into the chamber M.

The herein-described improved grate construction is adaptable to almost any ordinary boiler. The upper grate, including the water-chambers D and E, can be applied as an attachment to existing boilers substantially in the same manner and as readily as to new boilers, and in either case the lower grate can be arranged, as described, to coact with the upper grate.

I claim—

1. In a combined downward and upward draft furnace, the combination of a lower upward-burning grate, an upper downward-burning grate consisting of inclined water-tubes spaced widely apart, an intermediate combustion-chamber and an escape-flue leading from the combustion-chamber, means for conducting water down from near the bottom of the boiler into the lower ends of the water-tubes, and means for conducting water upward from the higher ends of the water-tubes and delivering the same back to the boiler at a higher level therein, the bars of the lower grate being spaced closer together than the tubes of the upper grate, substantially as described.

2. In a combined downward and upward draft furnace, the combination of the lower upward burning grate, an upper downward-burning-grate, an intermediate combustion-chamber, and an escape-flue leading from the combustion-chamber, the upper grate being formed of inclined water-tubes spaced widely apart as described, and at each end thereof connecting with a water-chamber in turn connected with the boiler, the connection with the lower end of the tubes being at or near the bottom of the boiler and the connection with the higher end thereof being at a higher level in the boiler, and the bars in the lower grate being spaced closer together than the tubes of the upper grate, substantially as described.

3. In a combined downward and upward draft furnace, the combination of the lower upward-burning grate, an upper downward-burning-grate, an intermediate combustion-chamber and an escape-flue leading from the combustion-chamber, the upper grate being formed of inclined water-tubes spaced widely apart and forming a series of zigzag spaces, as described, and at each end thereof connecting with a water-chamber in turn connected with the boiler, the connection with the lower ends of the tubes being at or near the bottom of the boiler and the connection with the higher ends thereof being at a higher level in the boiler, and the bars in the lower grate being spaced closer together than the tubes of the upper grate, substantially as described.

4. In a combined downward and upward draft furnace, the combination of the lower upward-burning grate, an upper downward-burning grate, an intermediate combustion-chamber, and an escape-flue leading from said combustion-chamber, the bars in said upper grate being spaced widely apart and forming a series of zigzag spaces, as described, and at each end thereof connecting with a water-chamber in turn connected with the boiler, and the bars in said lower grate being spaced closer together than are the bars of said upper grate, substantially as described.

5. In a combined downward and upward draft furnace, the combination of the lower upward-burning grate, an upper downward-burning grate, an intermediate combustion-chamber, and an escape-flue leading from said combustion-chamber, the bars in said upper grate being spaced widely apart and forming a series of zigzag spaces, as described, and at each end thereof connecting with a water-chamber in turn connected with the boiler, and the bars in said lower grate being spaced closer together than are the bars of said upper grate, and the ash-pit extending below the floor of the boiler-room and beyond the furnace-front, substantially as described.

MELVILLE C. HAWLEY.

Witnesses:

EPHRAIM BANNING,

THOMAS A. BANNING.